March 6, 1973  J. SOHN  3,719,131
PHOTOGRAPHIC SHUTTER WITH ELECTRONIC TIMING DEVICE
Original Filed Oct. 10, 1968  3 Sheets-Sheet 1

INVENTOR
Jörg Sohn
BY
March, Gillette & Wyatt
ATTORNEYS

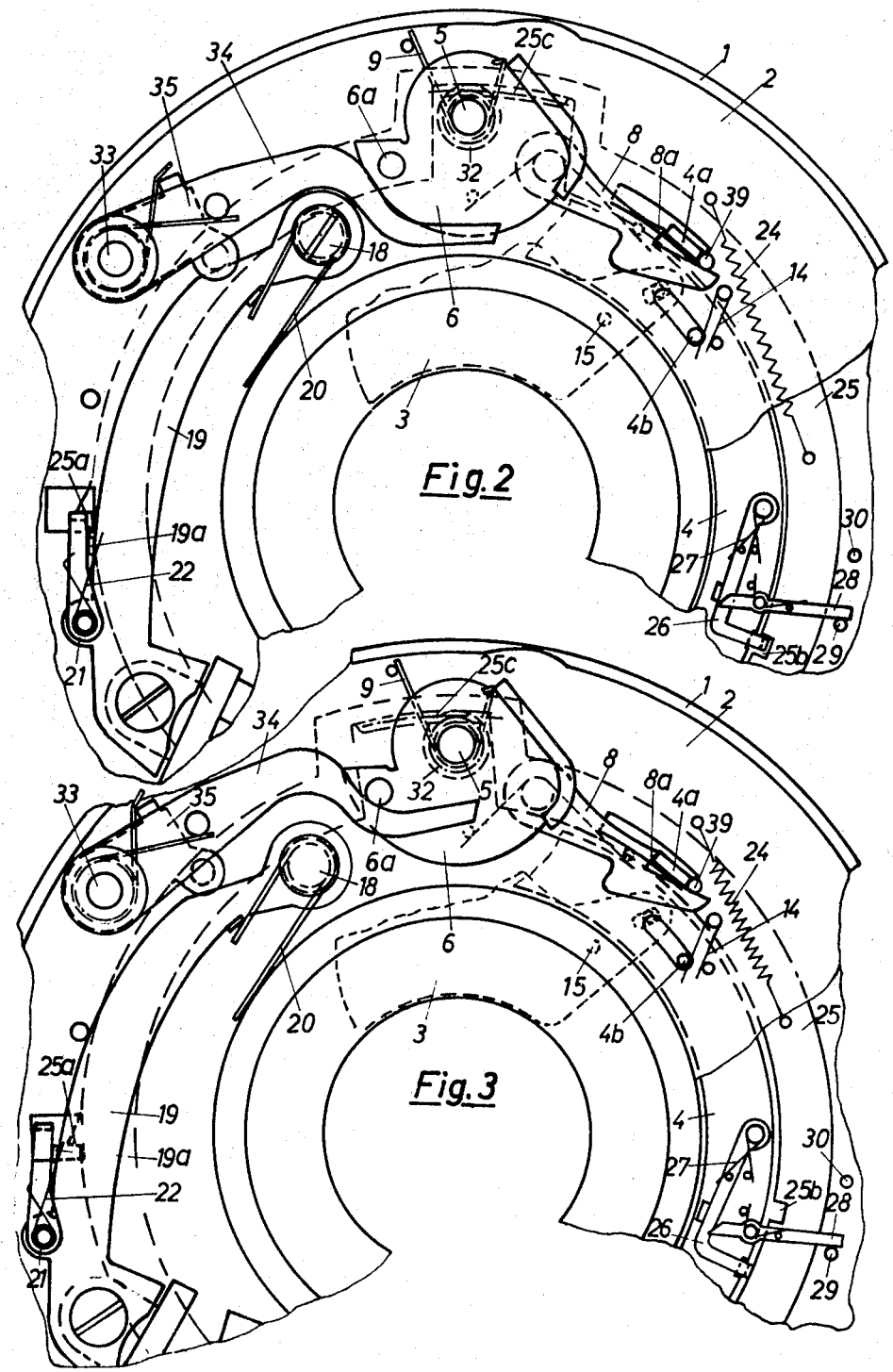

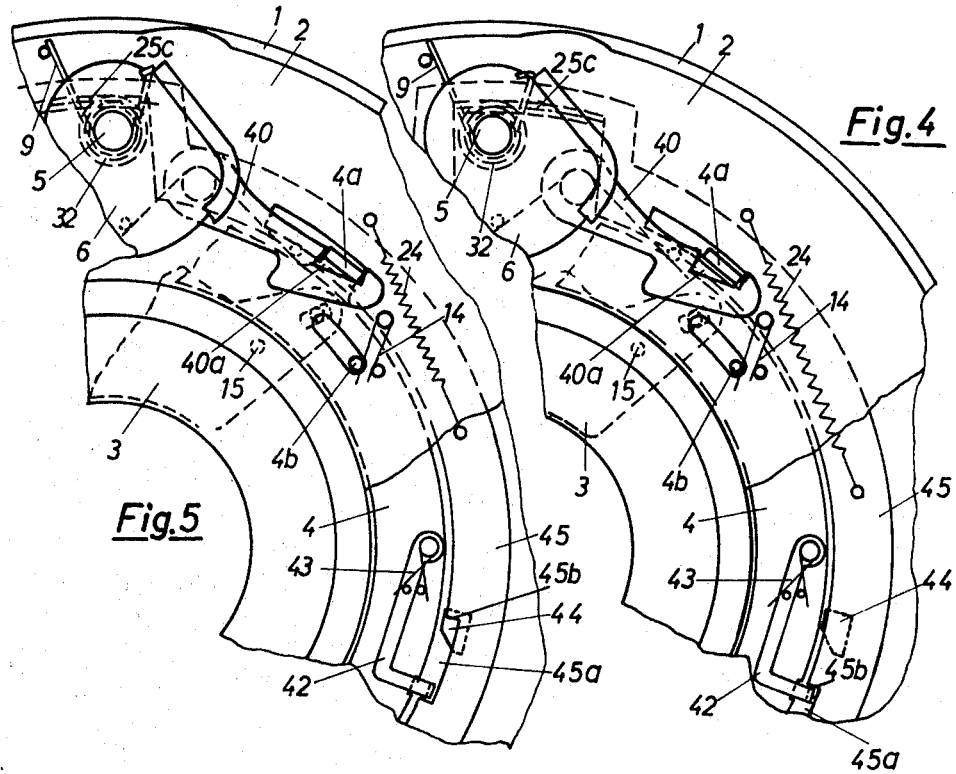
Fig.4
Fig.5
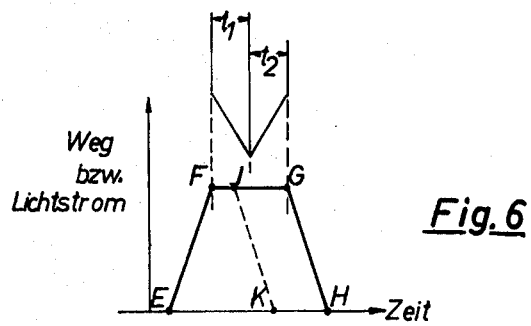
Fig.6
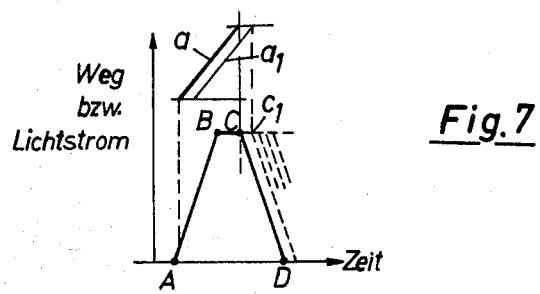
Fig.7

United States Patent Office 3,719,131
Patented Mar. 6, 1973

3,719,131
PHOTOGRAPHIC SHUTTER WITH ELECTRONIC TIMING DEVICE
Jörg Sohn, Calmbach, Black Forest, Germany, assignor to Prontor-Werk Alfred Gauthier G.m.b.H., Calmbach, Black Forest, Germany
Continuation of abandoned application Ser. No. 766,606, Oct. 10, 1968. This application May 10, 1971, Ser. No. 142,023
Int. Cl. G03b 9/14
U.S. Cl. 95—53 E                3 Claims

ABSTRACT OF THE DISCLOSURE

A photographic shutter is provided having a reciprocating sector driving member and electro-magnetic unit for locking the driving member in the open position. Electronic timing apparatus is provided for determining the time the electro-magnetic unit holds the driving member locked in the open position. Advantageously the control member cooperates with two independently controllable locking members and the electro-magnetic unit for locking and unlocking the driving member. The control member is operable to be coupled to the driving member in the open position of the sectors.

Figure 1:
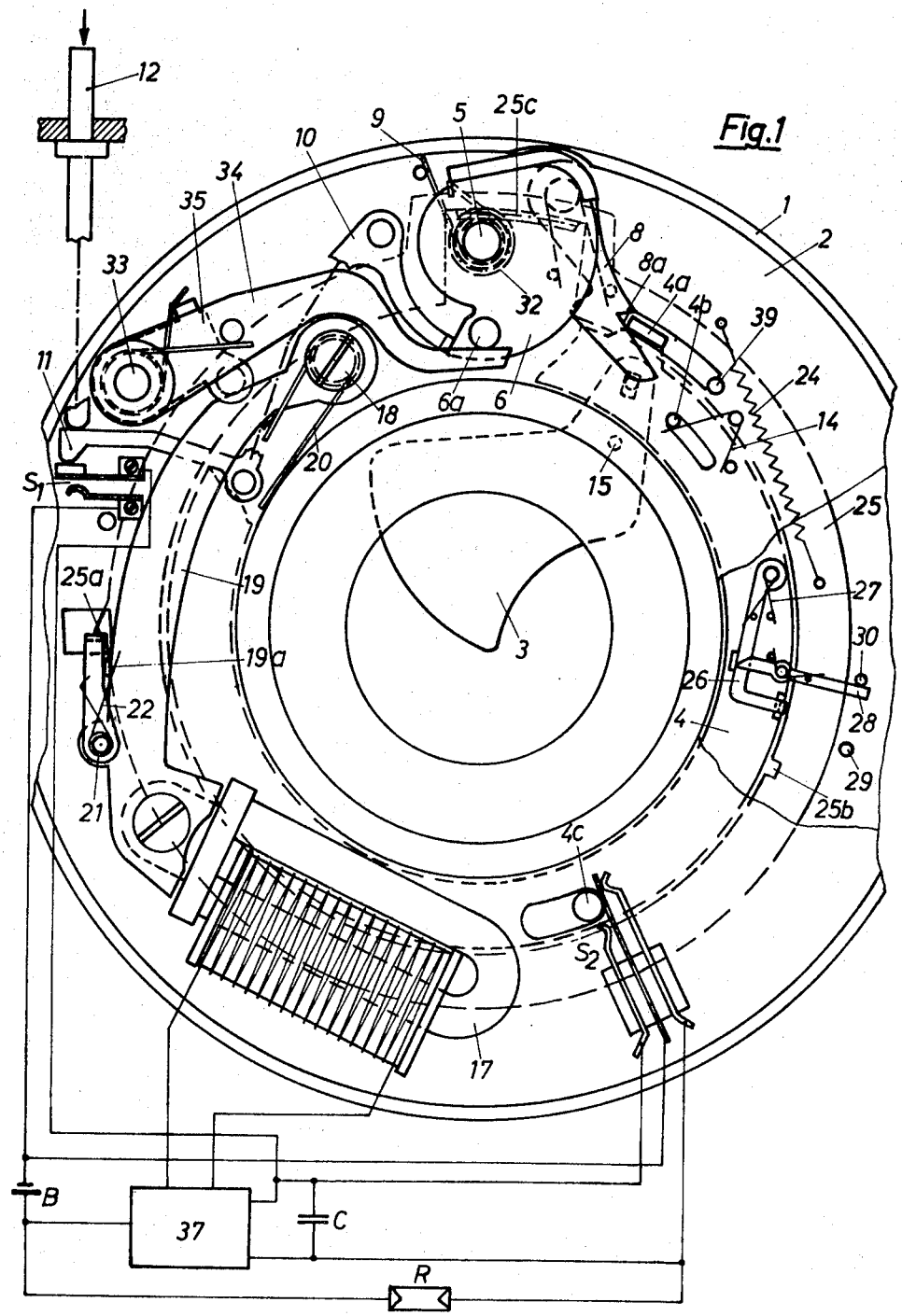

This application is a continuation of Ser. No. 766,606, filed Oct. 10, 1968, and now abandoned.

This invention concerns a photographic shutter with a reciprocating sector driving member which can be locked by electro-magnetic means in the open position of the sectors for the duration of a time determined by an electronic timing device.

In shutters of this type a locking pawl is provided for locking the sector driving ring in the open position of the sectors, which pawl, at the end of the opening movement of the sector driving ring, engages an edge thereof and thereby locks it. Upon the conclusion of the timing operation of the electronic device, the locking pawl is disengaged from the sector driving ring by an armature lever of the electro-magnetic means after which the ring continues its return movement and brings the sectors back to their closed position. Such an arrangement is not perfect since, in the case of shutters having a minimum possible exposure time of 4 ms. or less for example, exposure time control in this range is not possible. The reason for this is the necessary dependence of the unlocking operation on the opening movement of the sector driving ring, the result of which is that the unlocking can take place only after the shutter open position is reached, and after the previous locking movement. Since time for engaging and disengaging of the locking pawl cannot be brought below a specific limiting value due to inertia and friction, an adjustment of the exposure time down to the shortest unimpeded time is not possible.

The object of the present invention is to surmount this disadvantage, and to improve a shutter of the above described type so that a continuous adjustment of the exposure time down to the shortest possible is available, the shutter being fully opened for each exposure. To achieve this object it is proposed, in accordance with the present invention, to provide a control member for locking and unlocking the sector driving member, the said locking member being associated and connectable therewith in the open position of the sectors, and two separate and independently controllable locking members are provided. The unlocking movement is made independent of the opening movement of the sector driving member so that the unlocking movement can begin when, or even before, the open position of the sectors is reached. This, in turn, means that the exposure time can be reduced substantially continuously down to the shortest, unimpeded exposure time of the shutter.

In order to achieve the desired result with the minimum of parts, while ensuring continuous and reliable operation, it is proposed that the control member associated with the sector driving member is subjected to the traction of a spring and is lockable and releasable in a predetermined starting position by one locking member actuated by means of the electromagnetic means, while the other locking member is arranged on the sector driving member and is induced to couple with the control member when the reverse phase of the driving member is reached. The coupling operation of the sector driving member with the control member may be achieved in the open position of the sectors by a displaceable retaining member associated with the locking member provided on the sector driving member, which cooperates with two stationary stops in such manner that the locking member is released in the reverse phase and is positively brought out of the operative position again when the return of the sector driving member is completed.

Details of the invention will be aparent from the following description and the accompanying drawings in which two embodiments of the present invention are illustrated.

In the drawings:
FIG. 1 shows an electronically controlled shutter having a unilaterally operating slide crank drive which as well as the annular control member assumes the cocked position.
FIG. 2 shows a partial view of FIG. 1 in the open position of the shutter, the sector ring being coupled to the still locked control ring.
FIG. 3 shows the same shutter arrangement, again in the open position, but with the control ring released.
FIG. 4 is a partial view of another embodiment of a shutter having a slide crank drive driven in both directions of rotation, the sector ring being locked in the open position on the still blocked control ring.
FIG. 5 shows the same arrangement as in FIG. 4, also in the open position, and with the control ring having run down.
FIG. 6 shows the time course taken by the locking and unlocking process dependent on the opening movement of the sector ring, in conjunction with a light flux and time diagram.
FIG. 7 is a similar view of the time course of the unlocking operation when independent of the opening movement of the sector ring, also in conjunction with a light flux and time diagram.

In FIG. 1, a housing 1 of a photographic shutter has a baseplate 2, supporting a shutter driving mechanism. The latter, in the embodiment shown in FIGS. 1–3, is unilaterally acting, i.e., it is designed so that it is able to transmit only an opening movement to a reciprocating sector ring 4 provided under the baseplate 2 and cooperating with sectors 3. The driving mechanism comprises a disc 6 fixed to a rotatable tensioning spindle 5 on which disc a pawl 8 is pivoted, able to act by means of a slide edge 8a on a flap 4a of the sector ring 4. The driving disc 6 is urged in a clockwise direction by a driving spring 9 and locked by a trigger lever 10 in the cocked position shown in FIG. 1. The trigger lever 10 cooperates, as shown in the same figure in chain-dotted lines, with an intermediate lever 11, on which a trigger 12 is able to act.

A pin 4b mounted on the sector ring 4 is biassed by a relatively weak spring 14 acting in the closing direction of the sector ring. The sector ring 4 is in driving connection by means of a pin-and-slot arrangement with the shutter sectors 3 which in turn are each journalled to rotate on a stationary pin 15.

In order to achieve different exposure times an electromagnetic locking device which is controlled by an electronic timing circuit is provided to interrupt the motion of the sector ring 4 in the open position of the sectors 3 for a predetermined period. This locking mechanism is designed so that the unlocking of the sector ring 4 can take place independently of its opening movement and locking. In the embodiment shown the locking mechanism comprises an electromagnet 17 which is connected to the electronic timing circuit and with which an armature lever 19 journalled on a pin 18 is associated, the lever 19 being biassed by a spring 20 in clockwise direction. The armature lever 19 carries a locking pawl 21 which is supported on a flap 19a of the armature lever under the bias of a spring 22. The locking pawl 21 locks a control ring 25 arranged to rotate concentrically to the sector ring 4 and subjected to the traction of a spring 24, in the cocked position of said ring 25; the latter has a projection 25a for this purpose.

Another pawl 26 is provided to couple the sector ring 4 with the control ring 25 at the end of the opening movement, if the control ring 25 assumes the cocked position shown in FIG. 1. By this means the sector ring 4 is locked for a certain time before the return motion can commence. The pawl 26 is arranged to rotate on the sector ring 4 and is able, under the influence of a spring 27, to drop into a recess 25b on the control ring. In order to make it possible for the pawl 26 to enter the recess 25b only at the end of the opening movement of the sector ring 4, a spring-loaded retaining member 28 is provided on the sector ring 4, and keeps the pawl in an inoperative position during the opening movement of the sector ring. When the sectors 3 are fully open, the retaining member 28 comes into contact with a fixed pin 29 and thereby releases the pawl 26 to drop into the recess 25b. Upon the return of the sector ring 4 to the starting position the retaining member 28 strikes against another stationary pin 30, whereby the pawl 26 is returned to the inoperative position shown in FIG. 1, as the result of the swivel movement of the retaining member.

In order to achieve a simple mode of operation, the transfer of the control ring 25 to the tensioning position is coupled with the tensioning operation of the shutter drive. For this purpose the control ring 25 is provided with teeth 25c which mesh with a pinion freely rotatable on the locking tensioning spindle 5. This pinion is driven in a clockwise direction by means (not shown) during the tensioning process, whereby the control ring 25 is brought to the tensioned position. In the opposite direction of rotation the pinion 32 is uncoupled from its driving means so that the control ring 25 can move unimpeded.

Towards the end of the cocking movement the armature lever 19 is brought into contact with the electromagnet 17. This is effected by means of an intermediate lever 34 which is journalled on a pin 33 and is turned in a clockwise direction by a driving pin 6a mounted on the driving disc 6 when this disc is transferred to the tensioning position. An over-pull pawl 35, positively connected to the intermediate lever 34, takes part in this movement, acts on the armature lever 19 and brings it into contact with the electromagnet 17 against the bias of the spring 20. When this position is reached, the locking pawl 21 drops in front of the projection 25a of the control ring 25, whereby this lever is locked in the tensioned positioned.

The above-mentioned electronic timing circuit cooperating with the electromagnet 17 is of conventional design and is, therefore, only outlined in FIG. 1. The said device comprises an electronic switch 37 cooperating with a member determining the exposure time which, in the embodiment shown, comprises a photo-resistor R and capacitor C, the circuit interrupting the current in the electromagnet directly the timing operation is concluded. In order to connect the electronic circuit and the electromagnet 17 to a battery B, a contact switch $S_1$ is used which is closed when the trigger 12 is actuated. The circuit also comprises a changeover switch $S_2$ which, in the contact position shown in FIG. 1, short-circuits the capacitor C; when it changes over to the other contact position the capacitor can charge, and the switch simultaneously establishes a connection in parallel, with the contact switch $S_1$. The changeover switch $S_2$ is actuated in the embodiment shown by a switch pin 4c mounted on the sector ring 4. The arrangement is such that, in the first movement phase of the sector ring 4, the switch $S_2$ changes over so that the timing action can begin immediately the sector ring starts to move.

The mode of operation of the above described shutter shown in FIGS. 1–3, is as follows:

With the depression of the trigger push member 12 the contact switch $S_1$ is closed by means of the intermediate lever 11, and the driving disc released to start an exposure. The electromagnet 17 and the electronic circuit are energised by the switch $S_1$. The armature lever 19 is then held in the position shown in FIG. 1 by the field of the magnet, and the control ring 25 is temporarily locked in the tensioned position by means of the locking pawl 21. The released driving disc 6 comes into operation under the action of the spring 9 and accelerates the sector ring 4 in a clockwise direction. At the end of the opening movement of the sector ring 4, the retaining member 28 strikes against the fixed stop 29 and swings out so that the pawl 26 can drop into the recess 25b of the control ring 25 (FIG. 2). The sector ring 4 is thus in the open position and coupled to the still locked control ring, while the driving disc 6 runs unimpeded.

Immediately upon the first starting movement of the sector ring 4, the timing action of the electronic circuit is started by reversal of the switch $S_2$. Upon the conclusion of the timing action the electromagnet 17 becomes de-energised, as a result of the change-over of the electronic switch 37, whereupon the armature lever 19 turns in a clockwise direction under the bias of its spring 20 and at the same time disengages the locking pawl 21 from the control ring 25. This ring then rotates, driven by the spring 24, and simultaneously drives the sector ring 4, the shutter closing again. During the return of the sector ring 4, the relatively weak spring 14 plays only a subordinate part in comparison with the spring 24. When the starting position of the sector ring 4 is reached, the retaining member 28 strikes against the stationary pin or stop 30 and during its rotation returns the pawl 26 to the inoperative position shown in FIG. 1.

If shorter exposure times are determined by the electronic time control circuit in accordance with the existing light conditions, or, if desired, on the basis of a previous manual setting, then, the armature lever 19 and, consequently, also the control ring 25 are released correspondingly earlier due to the previous change-over of the electronic circuit. Since the disengagement of the locking pawl 21 is now independent of the opening process, the unlocking of the control ring 25 may already begin during the opening movement of the sector ring 4 and may be concluded when the sector ring 4 reaches the open position or earlier. In this case the sector ring 4 is not coupled with the control ring 25 after the sectors 3 have reached the open position since the control ring 25 has already left its cocked position. The closing movement of the sector ring 4 follows immediately upon the opening movement, the sector ring 4 returning to the starting position after striking against a reflex stop 39 in the open position and under the action of the spring 14.

The example shown in FIGS. 4 and 5 differs from the above described arrangement, insofar as this shutter arrangement is provided with a crank drive for driving the sector ring 4 in both directions of movement. The crank drive comprises the tensioning spindle 5 on which the driving disc 6 biased by the driving spring 9 is fastened. Pivoted on the disc 6 is a pawl 40 which engages the flap 4a of the sector ring 4 by a slot 40a. The ring carries a pawl 42 which is supported on a fixed ramp 44 in the starting position of the sector ring 4 under the bias of a spring 43. To lock the sector ring 4 in the open position of the shutter by a control ring 45 biassed by means of a spring 24, there is a recess 42a formed in the inner periphery of said ring, the edge 45b of the recess being engaged if required by the pawl 42 when the sectors 3 are fully opened, whereby the sector ring 4 is locked again. The recess 45a is designed so that if the control ring 45 starts prematurely, the sector ring 4 can execute its opening movement unimpeded.

After the triggering of the shutter, the sector ring 4 is brought to the shutter open position by the crank drive 6, 40, the pawl 42 leaving the ramp 44 and sliding along the inner circumference of the control ring 45. If a relatively long exposure time yields, the control ring 45 is still in the tensioned position shown in FIG. 4 when the sector ring 4 reaches the open position. The pawl 42 therefore drops into the recess 45a of the control ring 45 and comes in contact with the edge 45b, whereby the sector ring and crank drive are provisionally locked. At the end of the electronic timing operation, the control ring 45 is unlocked and, under the bias of its spring 24, returns to the starting position shown in FIG. 5, while the slide crank drive 6, 40 brings the sector ring 4 to the starting position. The pawl is then disengaged from the recess 45a by the ramp 44.

When a shorter time is determined by the electronic circuit, the control ring 45 and the shutter drive are unlocked correspondingly sooner. The beginning of the unlocking of the control ring 45 may then be advanced similar to the embodiment shown in FIGS. 1–3, relatively to the opening movement of the sector ring 4 so that the unlocking is concluded simultaneously with reaching the sectors 3 in the open position. In this case the closing operation follows directly upon the opening movement, the two rings 4 and 45 returning approximately simultaneously to the starting position. If the electronic circuit determines an even shorter time, the control ring 45 is already unlocked and could, as shown in FIG. 5, reach its starting position precisely at the moment the sector ring commences its return phase, thus returning immediately to the shutter closed position without impediment.

The continuous control of the exposure time down to the shortest unimpeded exposure time, using a shutter constructed according to the invention, is shown in FIG. 7. This shows a light flux and time diagram A, B, C, D for the shortest exposure time of a shutter with reciprocating sectors. In this diagram the straight line $a$ shows the time of the unlocking operation of the pawl 21. The illustration shows that the unlocking begins shortly after the start of the sector ring 4 corresponding to the time determined by the electronic circuit, i.e. it begins during the opening movement. The unlocking is concluded just when the sectors 3 begin to cover again the shutter opening. The shutter drive thus operates unimpeded, giving the shortest possible exposure time. If a longer time is determined by the electronic timing circuit, the straight line $a$ is displaced to the right and the straight line $a_1$ is obtained. This results in an increase in the fully open time, since the unlocking of the sector ring is concluded only at the point $C_1$ in accordance with the said longer time and the straight line between the points C–D is displaced more to the right, so that a continuous control of the exposure time is obtained, beginning with the shortest possible exposure time.

FIG. 6 shows the possible adjustment in the region of the shortest exposure time for a shutter in which the locking pawl can drop into the locking position only at the end of the opening movement of the sector ring. In this diagram, the light flux and time diagram of this shutter is shown by the points E, F, G, H, and corresponds to the shortest controlled exposure time. This diagram shows the time taken by the locking pawl in cooperation with the sector ring. The dropping of the locking pawl into the locking position begins at the end of the opening movement of the sector ring and is concluded after the time $t_1$. Immediately after this follows the unlocking of the locking pawl, which occupies the time $t_2$. Between the shortest controlled time shown by the points E, F, G, H, and the shortest unimpeded time which is shown by the points E, F, J, K, no adjustment is possible since the beginning of the fall of the locking pawl cannot be advanced and the times $t_1$ and $t_2$ cannot be shortened below a predetermined value.

I claim:
1. In a photographic camera drive,
a shutter,
means to support the shutter,
a reciprocating sector drive means connected to the shutter and having an open and a closed position for controlling the shutter opening and closing,
an electromagnetic locking means on the shutter support means for holding the drive means in an open position,
control means coupled with the sector drive means for locking said sector drive means in its open position,
a traction spring connected to the control means,
a second locking means adapted to be independently activated, one of said locking means being positioned on the sector drive means,
means connected to the drive means to maintain the selected open or closed state of the control means for locking and unlocking the drive means,
an electronic time-setting means,
electromagnetic means to move the control means for one of the locking and unlocking means following a set time interval of control provided by the time setting means, and
means associated with the other locking means in the sector driving means so that with phase reversal of the part it is coupled to the control part.

2. The photographic camera shutter apparatus as claimed in claim 1, comprising in addition,
means to stabilize the sector driving means control in a starting position by the control means for the locking and unlocking means,
a movable component in the electromagnetic means for carrying the electromagnetic means to control the said locking and unlocking means,
said last named means being an armature lever separate from the sector drive to engage the control member in the return phase.

3. The photographic camera shutter claimed in claim 2 comprising, in addition,
a displaceable retaining member associated with the sector shutter drive means for holding the driving means for the shutter in an open position,
a base plate carrying two fixed stop means, and
means for carrying said retaining member to cooperate with and engage the said two fixed steps so that said locking means is released to be operative during the shutter return phase and positively moved out of the open position when the return phase of said drive means is completed.

References Cited

UNITED STATES PATENTS

| 3,261,275 | 7/1966 | Rentschler | 95—63 |
| 3,358,575 | 12/1967 | Kitai | 95—63 |
| 3,520,239 | 7/1970 | Rentschler | 95—53 |

SAMUEL S. MATTHEWS, Primary Examiner

R. L. MOSES, Assistant Examiner

U.S. Cl. X.R.

95—63